Aug. 26, 1924.
U. J. THUAU
1,506,719
BLADE OF DISK FORM FOR SKINNING ANIMALS
Filed Jan. 23, 1924
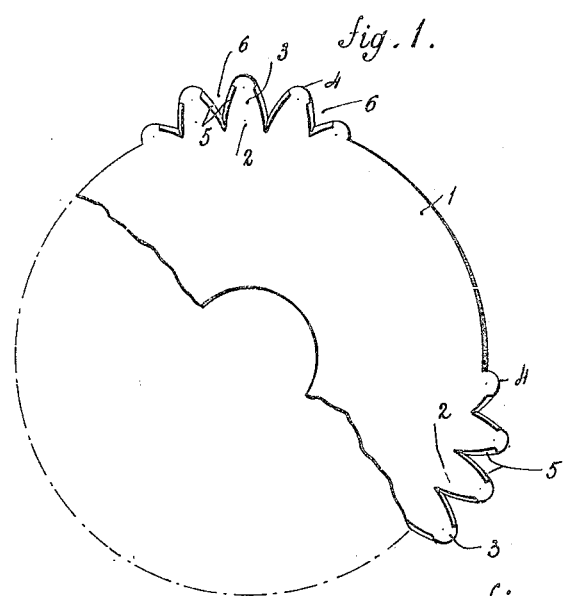
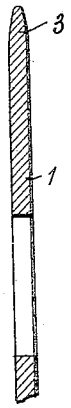
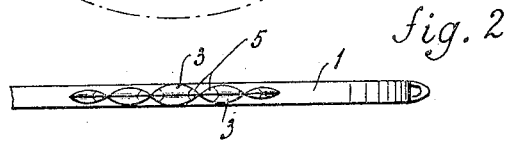
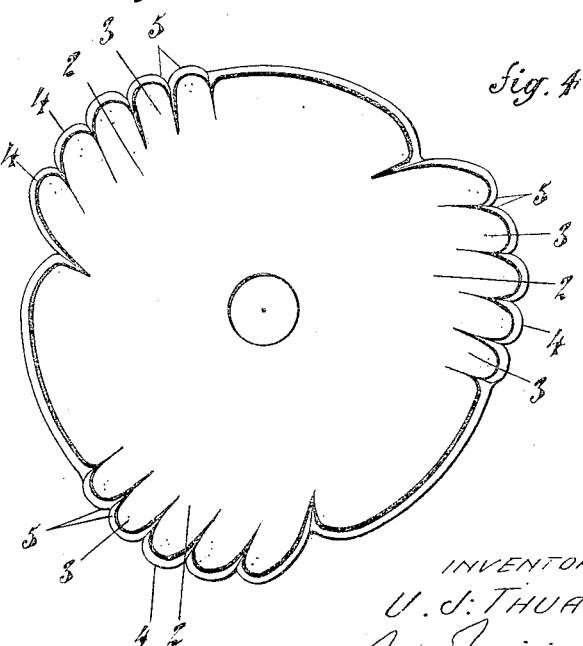
INVENTOR
U. J. THUAU,
ATTORNEY Patented Aug. 26, 1924.

1,506,719

UNITED STATES PATENT OFFICE.

URBAIN JULES THUAU, OF PARIS, FRANCE, ASSIGNOR TO THE SOCIETE INDUSTRIELLE DE DEPOUILLE MECANIQUE DES ANIMAUX, OF PARIS, FRANCE.

BLADE OF DISK FORM FOR SKINNING ANIMALS.

Application filed January 23, 1924. Serial No. 688,047.

*To all whom it may concern:*

Be it known that I, URBAIN JULES THUAU, engineer, citizen of Republic of France, residing at Paris, 54 Rue de Bondy, have invented new and useful Improvements in Blades of Disk Forms for Skinning Animals, of which the following is a specification.

Tools or cutters as ordinarily constructed for skinning animals, and mechanically inefficient in that the working parts on the whole of their circumference are either cutting edges or blunt edges. The inconvenience which results from the use of tools thus constructed consist in that knives, provided only with cutting edges, cut the skin, whilst tools provided only with blunt edges are not able to cut in two the cellular tissue found between the skin and the flesh.

It was therefore desirable to provide a tool or knife which in use could act at first as a tool to detach the skin by striking (whilst in cutting) and thereafter as a tool to cut the tissue.

The object of the present application is to provide a tool operative as a detaching tool and as a cutting tool and characterized essentially in that the edges coming into direct contact with the skin are non-cutting, while the edges before effecting the said proper preparation of the skin of the animal with the cellular tissue present set back cutting parts.

Another characteristic feature of the invention resides in the fact that the line of work of the tool is studied in order to ensure a continuous operation. Moreover, the spaces between the projecting tongues are calculated in such a manner that they exactly correspond to the cellular tissue which is presented to them to be cut.

But in spite of the fact that that blade gives good results, it also has slight inconveniences in the sense that it happens that the fibres of cellular tissue placed in the spaces provided between the tongues are not cut and thus cause a slackening of the speed of rotation of the blade and whence result vibrations in the apparatus and shocks in the flexible operator attached to the apparatus.

With the blade of the second constructional form these inconveniences are eliminated and it is characterized essentially by the fact that the tongues, teeth or bosses projecting from the disk are inclined to a suitable angle as only to leave small spaces between them.

Owing to the fact that the tool of the present invention is a blade of disk form, it offers the advantage that the fibres arising from the cutting of the cellular tissue can no more be caught and that moveover all air displacement capable of injuring the meat is done away with.

The invention is described hereafter in detail with reference to the annexed drawing representing, by way of example, and schematically, two constructional forms of a tool according to the invention.

Fig. 1 shows in side view a fragment of his tool.

Fig. 2 is a plan view.

Fig. 3 is a sectional elevation through the centre.

Fig. 4 shows the second constructional form in plan view.

As can be seen in the figures, the tool is composed of a disk 1 provided on its periphery with a suitable number two, three, four, or more working groups 2. Each of these groups is composed of a certain number of tongues, 3 (preferably five). The length of each of these tongues is such that their extremities are situated on an arc of a circle with a radius always equal and suitable. By such a disposition of tongues 3 the tool operates very smoothly and without producing shocks. These tongues are preferably arched over all their surface and constructed in such a manner that their extremities 4 that is to say those which come into direct contact with the skin do not cut whilst the edges 5 forming the spaces 6 are cutting.

By that combined disposition of the tongues 3 it is obtained on the one hand that the separated skin does not come into contact with the cutting parts of the blade which thus prevents all gashes or cuts in the skin. On the other hand, the cellular tissue can easily enter into the spaces 6 and be cut there by the set-back cutting edges 5.

The tongues present as plan views, preferably an elliptical form, but any other suitable form can be adopted. In the same manner, it is not necessary that the working groups 2 constitute a single member with the blade 1. Thus for example these parts 2 can be constructed independently of the blade 1 and then fixed laterally to the latter in such a manner as to present no lateral projection.

The tool of the second constructional form (Fig. 4) is also composed of a disk 1 provided on its periphery with a suitable number two, three, four or more of working groups 2. Each of these groups comprises any number, preferably five, of tongues 3 with a suitable length but inclined to a suitable angle.

The external part 4 of these tongues is non-cutting, whilst the internal part 5 is able to cut.

With that blade, if a piece of sinew or muscle or if an isolated fibre of the cellular tissue or even a piece of meat or fat which comes into contact with the internal part 5 is not cut, it is obliged to go out of the space owing to the inclined disposition of the tongues.

Owing to the fact that the tool is constituted by a blade of disk form and in consequence of the inclination of the tongues, these are always freed from the fibres, in such a manner that nothing impedes the speed of rotation of the blade.

The work with such a blade is thus smoother, simpler and permits the animal to be skinned quicker, and, moreover, prevents, in its rotation, any air displacement injurious to the meat.

It goes without saying that one can imagine differences of construction of the tool in order to be able to group the cutting parts and non-cutting in such a manner as to obtain the desired results. For example, alternate cutting parts and non-cutting can be conceived, the first not being in direct contact with the skin.

Claims.

1. A skinning tool, comprising a metallic member having a plurality of edge tongues, said tongues having non-cutting free ends and cutting edges in rear of such ends.

2. A skinning tool, comprising a disk having edge tongues arranged in groups, the free ends of the tongues being non-cutting, the adjacent side edges of the tongues being formed for cutting.

3. A skinning tool, comprising a disk-like member having edge tongues arranged in groups, with meeting side edges and free end edges, the meeting edges forming a cutting angle, the free ends of the tongues being non-cutting.

4. A skinning tool, comprising a member having a group of tongues projecting beyond the edge thereof, said tongues providing a series of re-entrant angular cutting edges, and non-cutting free ends.

5. A skinning tool, comprising a member having a group of tongues projecting beyond the edge thereof, said tongues providing a series of re-entrant angular cutting edges, and non-cutting free ends, the tongues being of elliptical form in cross section.

In testimony whereof he has signed his name to this specification.

URBAIN JULES THUAU.